Jan. 28, 1964 J. C. SAMMIS 3,119,452

COOLING DEVICE

Filed Nov. 9, 1961 2 Sheets-Sheet 1

JOHN C. SAMMIS
INVENTOR.

BY Allan M. Shapiro

ATTORNEY

Jan. 28, 1964 J. C. SAMMIS 3,119,452

COOLING DEVICE

Filed Nov. 9, 1961 2 Sheets-Sheet 2

JOHN C. SAMMIS
INVENTOR.

BY Allan M. Shapiro

ATTORNEY

United States Patent Office 3,119,452
Patented Jan. 28, 1964

3,119,452
COOLING DEVICE

John C. Sammis, West Covina, Calif., assignor to Albert G. Fink, Pico Rivera, Calif.

Filed Nov. 9, 1961, Ser. No. 151,260
9 Claims. (Cl. 169—2)

This invention relates generally to cooling devices and, more particularly, to novel cooling devices for an in-flight data recorder used in airplanes and the like.

The function of in-flight data recorders is to provide permanent records of the activities and operation of the aircraft. These records become particularly useful after an accident, such as a crash, in investigations for determining the causes of the accident by a study of the location, flight maneuvers, engine operations and the like of the aircraft preceding the accident. Fires are generally present in such accidents and suitabe means must be provided for protecting the recording medium, such as tape or the like, from destruction due to the exposure to abnormally high temperatures. Some heat protection of the recording medium is achieved by placing the operational components of the data recorder within a thermally insulated casing; however, this casing cannot by itself provide complete thermal protection nor is complete insulation of the casing desirable as heat is generated within the data recorder during its operation from the drive motor mechanism and electronic apparatus and this heat must be dissipated to prevent a temperature rise beyond tolerable operational limits.

It is therefore desirable to provide cooling devices that, after a fire in the aircraft, shall maintain the temperature within the data recorder below the destruction temperature of the recording medium until the data recorder can be extracted from the aircraft. It is also desirable that the cooling devices be capable of operation in the event of a crash whereby all power generators of the aircraft may be rendered inoperative. It is further desirable that the cooling devices not cause excessive cooling of the data recorder during normal operation.

Accordingly, it is a general object of the present invention to provide improved means for obtaining the desirable features mentioned above.

A more specific object of the present invention is to provide cooling devices capable of performing the heat absorbing functions necessary during exposure of an in-flight data recorder to abnormally high temperatures as caused by an aircraft fire.

Still another specific object of the present invention is to provide a cooling device capable of operation independent of an external power source.

Still another specific object of the present invention is to provide cooling devices that are light in weight, relatively small in size and capable of incorporation into existing data recorders.

The present invention comprises portable cooling devices for data recorders that require no external power source for their operation and are non-degenerating in that the operation of the cooling devices is not affected by their remaining inoperative for long periods of time. During normal operation of the data recorder, the cooling devices remain passive and shall actively function to prevent destruction of the recording medium when a predeterminable abnormally high temperature occurs within the recorder.

The cooling devices comprise a structure defining a chamber located entirely within the data recorder and containing a non-combustible coolant. The chamber structure is composed of a material possessing good thermal conductivity properties so that the temperature of the coolant is substantially immediately responsive to temperature increases within the recorder.

Closure means are provided to maintain the coolant within the chamber during normal ambient temperatures so that the coolant does not interfere with operation of the data recorder, and to permit the immediate release of the coolant into the data recorder enclosure when an abnormally high temperature is reached. The closure means are responsive to the pressure within the chamber and the temperature within the enclosure so that the coolant is retained within the chamber until it reaches a superheated state and, upon the release of the closure means, the coolant shall forcibly emit into the enclosure whereby immediate vaporization of the coolant occurs with concomitant absorption of great amounts of heat, thus preventing the destruction of the recording medium. The enclosure temperature at which the closure means shall release may be pre-determined by the selection of the coolant and the material composing the closure means.

A plurality of cooling devices may be provided to operate concurrently or sequentially and their configuration may be varied in order to be incorporated into variously designed data recorders without affecting their operation.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 1:
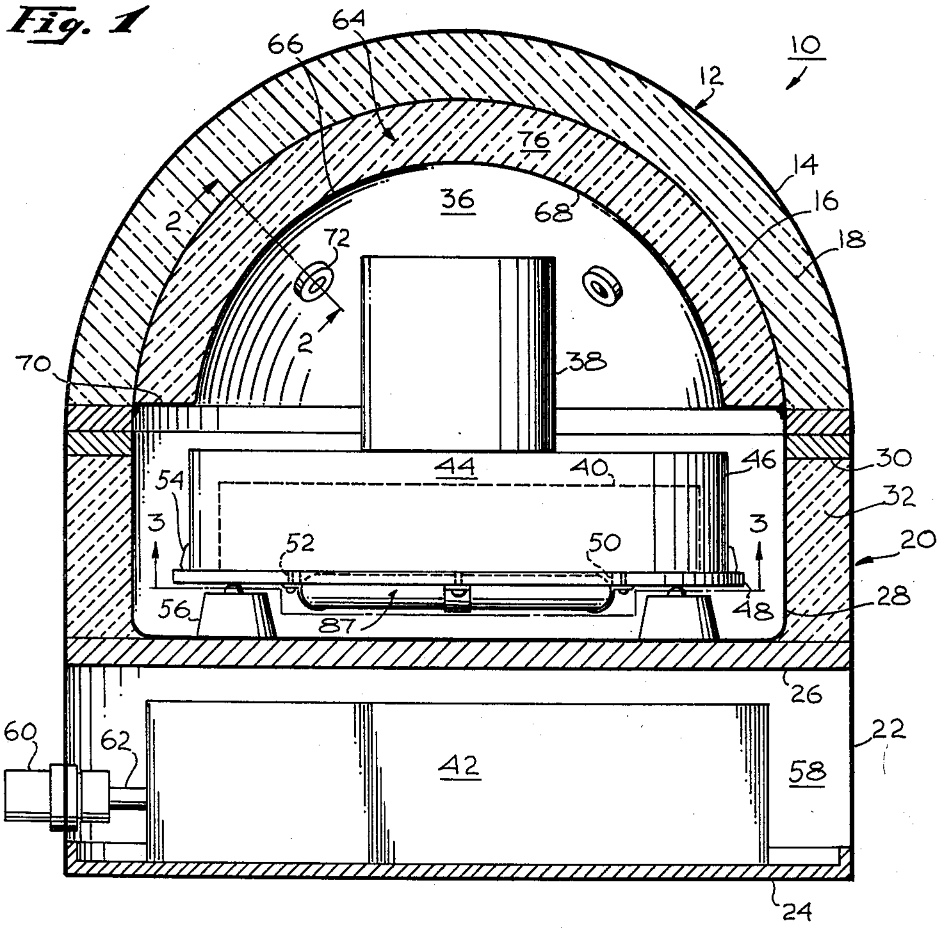
FIGURE 1 is a vertically sectioned view, partly in elevation, of a data recorder incorporating two embodiments of the present invention, portions of the recorder being shown in generally block diagram form.

With reference to FIGURE 1, this invention is illustrated as being incorporated within data recorder 10. As illustrated, data recorder 10 comprises an insulated top casing 12 having an outer hemisphere 14, inner hemisphere 16 and insulation 18 therebetween, and a partially insulated bottom casing 20. Bottom casing 20 comprises cylinder 22, circular end cap 24 releasably engaged with cylinder 22, circular disc 26 firmly affixed inside cylinder 22 parallel to and vertically spaced above end cap 24, cup 28 secured to the upper surface of disc 26 and ring 30 firmly affixed between the inside of cylinder 22 and the outside of cup 28 forming a volume wherein insulation 32 is contained. Top casing 12 is releasably secured to bottom casing 20 by a plurality of spring clip means (not shown) forming an insulated enclosure 36.

The operational components of data recorder 10 comprise drive motor mechanism 38, recording medium 40 and electrical means 42, all shown in block diagram form and being well known in the art. Recording medium 40 is contained in volume 44 defined by box 46 and circular plate 48, said plate 48 having a central aperture 50 and a plurality of smaller apertures 52 horizontally located on a circle having a diameter greater than aperture 50. Box 46 is releasably secured to plate 48 by a plurality of clip means 54. Drive motor mechanism 38 is mounted on box 46 and both are located within enclosure 36 and supported by plate 48 on a plurality of shock mounts 56 mounted on cup 28. Within the lower volume 58 defined by cylinder 22, end cap 24 and disc 26 is located electrical means 42. Incoming electrical impulses representing the data to be recorded are transmitted to electrical means 42 through a conventional connector 60, threadably secured to cylinder 22, and wires 62. By suitable electrical components (not shown) located within electrical means 42, the incoming impulses are converted to a suitable output signal and transmitted through conventional electrical wiring (not shown) to recording medium 40 for recordation.

Cooling device 64 is illustrated within enclosure 36 and comprises lining 66 having a hemispherical portion 68 and flanged portion 70, said flanged portion being formed by flaring the base of hemispherical portion 68 radially outward. Lining 66 is positioned concentrically within hemisphere 16 and sealed thereto at the peripheral edge of flanged portion 70 forming chamber 76. A plurality of apertures 72 extend through hemispherical portion 68 and may be located at substantially a 45° angular elevation from the base of lining 66.

Figure 2:
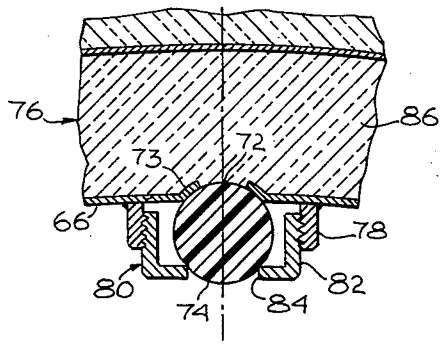
FIGURE 2 is a fragmentary section of one form of closure means as seen along line 2—2 in FIGURE 1.

With reference to FIGURE 2, closure means comprising a plurality of plugs 74 are employed to close apertures 72 and seal chamber 76. A variety of means may be utilized to releasably secure plugs 74 to lining 66. For example, as illustrated, plug 74 is a sphere having a diameter greater than the diameter of aperture 72. Lining 66 is pressed outward at apertures 72 to form a dish 73 shaped to the contour of plugs 74 with the depth of the dish 73 being less than the radius of plug 74. Ring 78 internally threaded and having a minor thread diameter greater than the diameter of plug 74 is welded or brazed to lining 66 with the axis of ring 78 aligned with the axis of aperture 72. A restraining member sleeve 80 having external threads is threadably engaged in ring 78. Sleeve 80 comprises a lower portion 82 having an inside diameter greater than the diameter of plug 74, and an upper portion 84 having an inside diameter less than the diameter of plug 74. The length of sleeve 80 is sized in relation to the diameter of plug 74 and depth of dish 73 so that upon tightening sleeve 80 in ring 78, the lower edge of upper portion 84 shall engage plug 74 without any contact between the lower surface of bottom portion 82 and lining 66 thereby forcing plug 74 against dish 73 and sealing chamber 76. A non-combustible coolant 86 is contained within chamber 76 and substantially fills the chamber.

Figure 3:
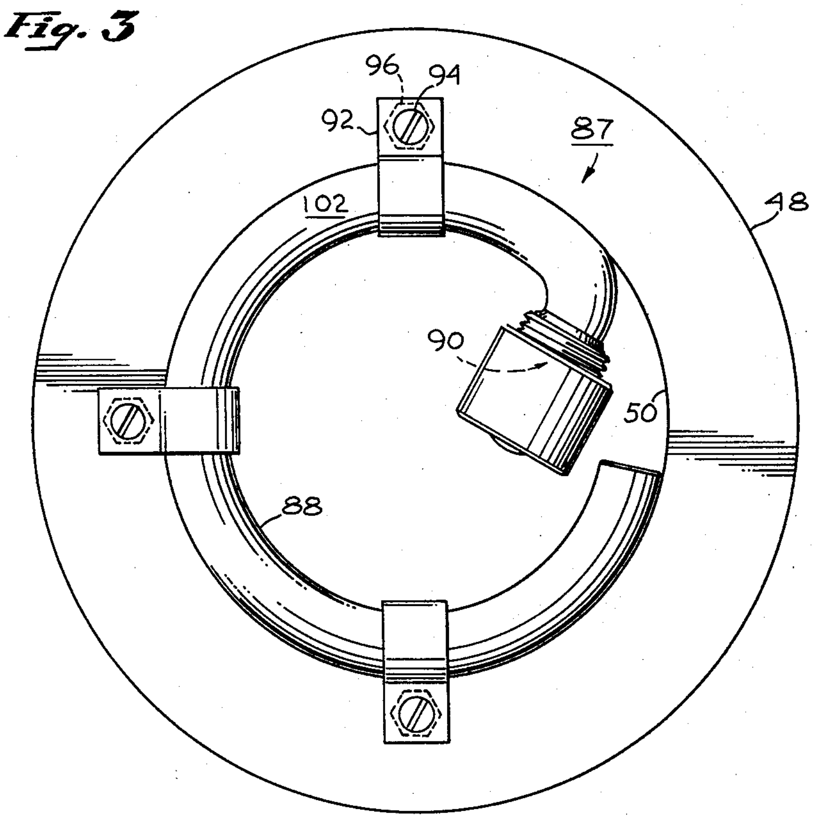
FIGURE 3 is a fragmentary bottom plan view of one embodiment of the present invention as seen along line 3—3 in FIGURE 1.

With reference to FIGURE 3, cooling device 87 is illustrated comprising tube 88 having one end 90 open and the other end sealed defining chamber 102, and formed along its longitudinal axis to fit into the available space adjacent recording medium 40. For example, as illustrated, tube 88 is circularly formed with end 90 angularly bent inward towards the axis of the formed circle, and secured to plate 48 by a plurality of conventional hose clamps 92 and a plurality of screws 94 and nuts 96 extending through apertures 52. Tube 88 is positioned concentrically within aperture 50.

Figure 4:
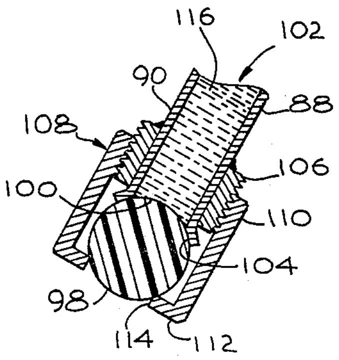
FIGURE 4 is a fragmentary sectional view of the closure means illustrated in FIGURE 3.

With reference to FIGURE 4, plug 98 is employed to close the open end of tube 88 and seal chamber 102. A variety of means may be utilized to releasably secure plug 98 to tube 88. For example, as illustrated, plug 98 is a sphere having a diameter greater than the inside diameter of tube 88. Tube 88 is flared outwardly at aperture 100 to form a seat 104 for plug 98. Ring 106 having external threads is brazed or welded to the outside of tube 88 and positioned on end 90 below the flared seat 104. A restraining member collar 108 is threadably engaged with ring 106 and comprises a lower portion 110 having internal threads and an upper portion 112 having an aperture 114 with a diameter less than the diameter of plug 98. The minor thread diameter of collar 108 is greater than the diameter of tube 88 at seat 104 to permit passage of collar 108 around tube 88. Upon tightening collar 108 on ring 106 the lower edge of upper portion 112 engages plug 98 forcing it against seat 104 thereby closing open end 90 and sealing chamber 102. A non-combustible coolant 116 is contained within chamber 102 and substantially fills the chamber. It is appreciated that the configuration of tube 88 may be varied to permit its incorporation into other data recorders having operational components differently sized and located.

The maximum tolerable ambient temperature within enclosure 36 is determined by the temperature at which recording medium 40 is destroyed. For example, if recording medium 40 is Mylar tape the ambient temperature within enclosure 36 should not exceed 250° F. Plugs 74 and 98 are fabricated from a material having a plastic temperature at which the physical strength of said plugs is substantially decreased below the tolerable ambient temperature within enclosure 36 and above the normal operating temperature of the data recorder. Coolants 86 and 116 are non-combustible liquids having a boiling temperature at standard conditions lower than the plastic temperature of plugs 74 and 98 and greater than the normal operating temperature of the data recorder. Lining 66 and tube 88 are fabricated from a material possessing good thermal conductivity properties and having a melting temperature substantially greater than the tolerable ambient temperature within enclosure 36. Ring 78, sleeve 80, ring 106 and collar 108 are fabricated from materials having a melting temperature substantially greater than the tolerable ambient temperature within enclosure 36. Of course, it will be realized that the other components comprising the data recorder are fabricated from materials having melting temperatures substantially greater than the tolerable ambient temperature within enclosure 36. For example, if recording medium 40 is Mylar tape, the tolerable ambient temperature within enclosure 36 is 250° F., coolants 86 and 116 may be water having a boiling temperature of 212° F. at standard conditions, plugs 74 and 98 may be fabricated from polystyrene having a plastic temperature of 220° F., and lining 66 may be fabricated from aluminum.

During normal operating conditions, absent any external heat source such as a fire in the aircraft, coolants 86 and 116 in chambers 76 and 102 respectively may provide sufficient absorption of the heat generated by the operation of the drive motor mechanism 38 to prevent a temperature rise within enclosure 36 beyond the tolerable point. The volume of coolant necessary to accomplish this and hence the dimensions of chambers 76 and 102 will be governed by the amount of heat generated by a particular model drive motor.

In the event of a fire, the enclosure temperature exceeds normal operating conditions with a corresponding increase in the temperature of coolants 86 and 116. Accordingly, the pressure in chambers 76 and 102 shall increase with the rise in temperature of coolants 86 and 116 respectively due to a partial vaporization thereof. The increased pressures within the chambers shall result in increasing the boiling temperatures of the coolants beyond their boiling temperature at standard conditions whereby the coolants shall substantially remain liquid in a superheated state. The pressure within chambers 76 and 102 shall be greater than the enclosure pressure due to the partial vaporization of the coolants. When the enclosure temperature reaches an abnormal level and exceeds the plastic temperature of plugs 74 and 98, the plugs shall substantially lose their strength and soften, and the pressure differential between the chambers and the enclosure shall force plugs 74 and 98 to disform and disengage their restraining member, sleeve 80 and collar 108 respectively, and burst into enclosure 36 thereby releasing coolant 86 from chamber 76 and coolant 116 from chamber 102. Coolants 86 and 116 upon emission from chambers 76 and 102 respectively, enter enclosure 36 which is at a lower pressure than chambers 76 and 102, thereby lowering the boiling temperature of the coolants below the temperature of the coolants and causing an immediate vaporization thereof. During this process, the coolants change from a liquid state to a gaseous state and energy is absorbed from enclosure 36 in the form of heat to effectuate the vaporization of the coolants thereby substantially lowering the temperature within enclosure 36.

In order to facilitate the filling of chamber 76 with coolant 86, the coolant may be combined in an adsorbing material such as alumina. The coolant in such combination retains its temperature characteristics and the release of the coolant from chamber 76 shall occur as described above; however, upon the emission of the coolant from chamber 76, the alumina will remain within the chamber in a dehydrated condition and thus provide additional insulation for casing 12.

It will be noted that cooling devices 64 and 87 are completely portable in that their components are within the data recorder and require no external power source for the operation of the cooling devices.

It is appreciated that the abnormally high temperature within enclosure 36 at which the cooling devices operate is determined by the boiling temperature at standard conditions of coolants 86 and 116 and the plastic temperature of the plugs 74 and 98. In order to provide for consecutive operation of the cooling devices rather than concurrent operation as described above, the coolants may be different liquids having different boiling temperatures or the plugs may be composed of different materials having different plastic temperatures. For example, coolants 86 and 116 may be water and plug 98 may be composed of a material having a plastic temperature of 220° F. and plugs 74 may be composed of a material having a plastic temperature of 230° F. In this manner, cooling device 87 shall operate substantially as described above when the enclosure temperature reaches 220° F. Should the operation of cooling device 87 provide sufficient cooling of the enclosure until the data recorder can be extracted from the aircraft, cooling device 64 shall remain inoperative thereby limiting the volume of coolant within the enclosure to a minimum. Should the enclosure temperature continue to rise after the operation of cooling device 87 to a temperature of 230° F., cooling device 64 shall operate substantially as described above, thereby providing additional cooling of the enclosure.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a casing defining an enclosure, cooling apparatus comprising, in combination: a first cooling device comprising a first non-combustible coolant, a lining having a plurality of apertures and positioned within and sealed to the inside surface of said casing thereby defining a first chamber for containing said first coolant, and first releasable closure means in closing relationship to said apertures and communicating between said first chamber and said enclosure; and a second cooling device comprising a member defining a second chamber having an opening, a second non-combustible coolant disposed within said second chamber, and second releasable closure means in closing relationship to said opening and communicating between said second chamber and said enclosure whereby said first and second closure means prevent release of said first and second coolants into said enclosure during normal ambient temperatures within said enclosure, and said first and second closure means automatically release respective said coolants from respective said chambers into said enclosure in response to respective first and second abnormally high ambient temperatures within said enclosure for sequential absorption of abnormal heat within said enclosure.

2. A cooling device adapted for disposition completely within a casing defining an enclosure containing apparatus operable during normal ambient temperatures within said enclosure and subject to failure or destruction upon the occurrence of abnormally high such ambient temperatures, comprising:

first means defining a chamber located entirely within said enclosure;

a non-combustible coolant disposed inside said chamber, said coolant tending to vaporize in response to an increase in its temperature for causing an increase in pressure within said chamber; and releasable closure means communicating between said chamber and said enclosure for retaining said coolant within said chamber during normal ambient temperatures within said enclosure, said closure means being composed of a material the physical strength of which is substantially reduced in response to a substantial increase in its temperature, the combination of such reduced physical strength and increased coolant pressure causing said closure means to automatically release said coolant from said chamber into said enclosure in response to an abnormally high temperature within said enclosure.

3. A cooling device in accordance with claim 2 wherein said first means comprises the inside surface of said casing and a lining positioned within and sealed to said inside surface of said casing, said lining defining at least one aperture therein for receiving said closure means; and said closure means comprises a corresponding at least one plug and restraining means releasably securing said plug to said lining whereby said plug closes said aperture during normal ambient temperatures within said enclosure, said plug constituting a sphere having a diameter greater than the diameter of its corresponding said aperture, and said restraining means comprises a cup-shaped sleeve encircling said sphere and having a circular end opening of lesser diameter than said sphere.

4. A cooling device in accordance with claim 3 wherein said lining is composed of high thermal conductivity material; said coolant is a liquid, the boiling temperature of which at standard conditions is greater than said normal ambient temperature within said enclosure and less than said abnormally high temperature within said enclosure; and said plugs are composed of a material, the physical strength of which is substantially reduced at temperatures greater than the boiling temperature of said coolant at standard conditions and less than said abnormally high temperature within said enclosure.

5. Apparatus in accordance with claim 4 wherein said coolant is in combination with an adsorbing material within said chamber during normal ambient temperatures within said enclosure.

6. In a data recorder having a casing defining an enclosure, a cooling device comprising:

means defining a chamber located entirely within said enclosure;

a non-combustible coolant disposed within said chamber, said coolant tending to vaporize in response to an increase in its temperature for causing an increase in pressure within said chamber; and releasable closure means communicating between said chamber and said enclosure for retaining said coolant within said chamber during normal ambient temperatures within said enclosure, said closure means being composed of a material the physical strength of which is substantially reduced in response to a substantial increase in its temperature, the combination of such reduced physical strength and increased coolant pressure causing said closure means to be released for automatically releasing said coolant from said chamber into said enclosure in response to the occurrence of an abnormally high ambient temperature within said enclosure.

7. In combination, cooling apparatus disposed entirely within an enclosure defined by a casing, such enclosure containing data recorder apparatus operable during normal ambient temperatures within said enclosure and subject to failure or destruction upon the occurrence of abnormally high such ambient temperatures, comprising:

a first cooling device comprising a first water coolant, a lining having at least one aperture and positioned within and sealed to the inside surface of such casing thereby defining a first chamber for containing said first water coolant, and first releasable closure means in closing relationship to said at least one aperture and communicating between said first chamber and said enclosure; and a second cooling device comprising a member defining a second chamber having an opening, a second water coolant disposed within said second chamber, and second releasable closure means in closing relationship to said opening and communicating between said second chamber and said enclosure, whereby said first and second closure means prevent release of said first and second coolants into said enclosure during normal ambient temperatures within said enclosure, and said first and second closure means automatically sequentially release respective said coolants from respective said chambers into said enclosure in response to respective first and second abnormally high ambient temperatures within said enclosure for sequential absorption of abnormal heat within said enclosure.

8. The combination as defined in claim 7 wherein:

said coolants tend to vaporize in response to an increase in their temperature causing an increase in pressure within their respective said first and second chambers, and said first and second closure means are composed of materials the physical strengths of which are substantially reduced to differing extents in response to a substantial increase in their temperatures, the combination of such differing reduced physical strengths and increased pressures causing sequential release of said coolants by their respective said closure means.

9. In combination, cooling apparatus disposed entirely within an enclosure defined by a casing, such enclosure containing data recorder apparatus operable during normal ambient temperatures within said enclosure and subject to failure or destruction upon the occurrence of abnormally high such ambient temperatures, comprising:

a first cooling device comprising a first coolant having a first boiling temperature, a lining having at least one aperture and positioned within and sealed to the inside surface of such casing thereby defining a first chamber for containing said first coolant, and first releasable closure means in closing relationship to said at least one aperture and communicating between said first chamber and said enclosure; and a second cooling device comprising a member defining a second chamber having an opening, a second coolant disposed within said second chamber and having a second boiling temperature differing from said first boiling temperature, and second releasble closure means in closing relationship to said opening and communicating between said second chamber and said enclosure, whereby said first and second closure means prevent release of said first and second coolants into said enclosure during normal ambient temperatures within said enclosure, and said first and second closure means automatically sequentially release respective said coolants from respective said chambers into said enclosure in response to respective first and second abnormally high ambient temperatures within said enclosure for sequential absorption of abnormal heat within said enclosure.

References Cited in the file of this patent

UNITED STATES PATENTS

| | | |
|---|---|---|
| 261,461 | Johnson et al. | July 18, 1882 |
| 1,282,769 | Dennich | Oct. 29, 1918 |
| 1,297,492 | Rauwald et al. | Mar. 18, 1919 |
| 2,664,955 | Winkler | Jan. 5, 1954 |
| 2,917,116 | Wyant | Dec. 15, 1959 |